United States Patent
Freitag et al.

(10) Patent No.: US 7,085,111 B2
(45) Date of Patent: Aug. 1, 2006

(54) LOW RESISTANCE ANTIPARALLEL TAB MAGNETORESISTIVE SENSOR

(75) Inventors: James Mac Freitag, San Jose, CA (US); Mustafa Michael Pinarbasi, Morgan Hill, CA (US); Patrick Rush Webb, Los Gatos, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 10/389,727

(22) Filed: Mar. 13, 2003

(65) Prior Publication Data
US 2004/0179312 A1  Sep. 16, 2004

(51) Int. Cl.
*G11B 5/39* (2006.01)

(52) U.S. Cl. ................. 360/324.12; 360/322
(58) Field of Classification Search ........... 360/324.12, 360/322
See application file for complete search history.

(56) References Cited

U.S. PATENT DOCUMENTS

| 6,127,045 | A | 10/2000 | Gill | 428/611 |
|---|---|---|---|---|
| 6,204,071 | B1 | 3/2001 | Ju et al. | 438/3 |
| 6,226,158 | B1 | 5/2001 | Pinarbasi | 360/322 |
| 6,262,869 | B1 | 7/2001 | Lin et al. | 360/324.11 |
| 6,421,212 | B1 | 7/2002 | Gibbons et al. | 360/327.31 |
| 6,778,364 | B1 * | 8/2004 | Dobisz et al. | 360/324.12 |
| 6,857,180 | B1 * | 2/2005 | Horng et al. | 360/324.12 |
| 6,876,527 | B1 * | 4/2005 | Gill | 360/324.12 |
| 2001/0012187 | A1 | 8/2001 | Lai et al. | 360/324.11 |
| 2001/0040782 | A1 | 11/2001 | Ju et al. | 360/327.3 |
| 2002/0054461 | A1 | 5/2002 | Fujiwara et al. | 360/324.1 |
| 2003/0058587 | A1 * | 3/2003 | Hasegawa et al. | 360/324.12 |

* cited by examiner

*Primary Examiner*—Craig A. Renner
(74) *Attorney, Agent, or Firm*—Bracewell & Giuliani LLP

(57) ABSTRACT

A magnetoresistive sensor having bias stabilization tabs includes a protective cap layer. The protective cap layer prevents oxidation, avoids potential damage from using ion milling for oxidation removal, and lowers parasitic resistance. In one embodiment, a bias layer, having a central portion with quenched magnetic moment, is formed over the free layer with an intervening coupling layer. A disk drive is provided with the magnetoresistive sensor including a protective cap layer.

5 Claims, 7 Drawing Sheets

LOW RESISTANCE ANTIPARALLEL TAB MAGNETORESISTIVE SENSOR

BACKGROUND OF THE INVENTION

1. Field of the Invention

The invention relates to a magnetic spin valve sensor typically used in a magnetic disk drive; and, more specifically, to an antiparallel tab magnetic spin valve sensor having a very low resistance conducting path.

2. Description of the Background Art

Disk drives using magnetic recording of digital information store most of the data in contemporary computer systems. A disk drive has at least one rotating disk with discrete concentric tracks of data. Each disk drive also has at least one recording head typically having a separate write element and read element for writing and reading the data on the tracks. The recording head is constructed on a slider and the slider is attached to a suspension. The combination of the recording head, slider, and suspension is called a head gimbal assembly. In addition, there is an actuator which positions the recording head over a specific track of interest. The actuator first rotates to seek the track of interest. After positioning the recording head over the track, the actuator maintains the recording head in close registration to the track. The disk in a disk drive has a substrate and a magnetic layer formed over the substrate for magnetic recording. The slider carrying the recording head has a disk facing surface upon which an air bearing is constructed. The air bearing allows the slider to float on a cushion of air and to be positioned close to the disk surface. Alternatively, the slider surface facing the disk can be adapted for partial or continuous contact with the disk. The read element in most contemporary disk drives include a magnetic spin valve sensor. A magnetic spin valve sensor is a sandwich of layers including a ferromagnetic pinned layer, a nonmagnetic electrically conducting layer, and a ferromagnetic free layer. The resistance of the spin valve sensor changes with respect to the direction and magnitude of an applied magnetic field such as the field from a written magnetic transition on a disk. To detect the change in resistance, sense current is passed through the sensor.

The free layer in a magnetic spin valve sensor is usually operated in the presence of a constant weak magnetic field to insure magnetic stability and prevent spurious signals. The application of a weak magnetic field to the sensor is sometimes referred to as magnetically biasing or magnetically stabilizing the sensor. One structure which may effectively be used for magnetic biasing is a pair of magnetic stabilization tabs which are antiparallel coupled to portions of the free layer. This biasing structure is effective. However, there are two practical problems. One, during annealing an oxide layer typically forms on the cap layer. This oxide layer must be thoroughly removed by ion milling before formation of the lead structures. If the oxide layer is not completely removed the resistance of the sensor increases. Since this additional resistance, sometimes called parasitic resistance, is not related to the sensor response to an external magnetic field, the effective sensitivity of the sensor is degraded. Two, the above mentioned ion milling operation easily causes damage to the magnetic biasing layer in the magnetic tabs. The most common damage from ion milling is a loss of magnetic moment of the magnetic biasing layer. It is important that the magnetic biasing layer have a slightly higher magnetic moment than the adjacent portion of the free layer. The magnetic biasing layers are very sensitive to damage from ion milling and therefore this sensor architecture is difficult to manufacture.

What is needed is a magnetoresistive sensor having antiparallel coupled bias tabs which has low resistance and is easy to manufacture.

SUMMARY OF THE INVENTION

A preferred embodiment of the invention provides a magnetoresistive spin valve sensor which has novel antiparallel coupled bias tabs. Each antiparallel biasing tab includes a ferromagnetic biasing layer which is antiparallel coupled with a portion of the free layer. Each antiparallel biasing tab also includes both a cap layer and a protective cap layer. The presence of the protective cap layer prevents oxidation of the cap layer during annealing. The presence of the protective cap layer also avoids an ion milling operation to remove oxidized material thus preventing possible damage to the bias layer.

An embodiment of a magnetoresistive sensor thus provided by the invention has a lower resistance and has very low risk for damage to the biasing layers during manufacture. Another embodiment of the invention provides a disk drive having a read element including a magnetoresistive sensor with antiparallel coupled bias tabs with a protective cap layer. Other aspects and advantages of the invention will become apparent from the following detailed description, which, when taken in conjunction with the drawings, illustrate by way of example the principles of the invention.

DETAILED DESCRIPTION OF THE INVENTION

A magnetoresistive sensor having antiparallel coupled biasing tabs according to a preferred embodiment of the invention includes a protective cap layer for each biasing tab. A sensor according to the invention has low parasitic resistance. During manufacture, a sensor having a bias tab structure according to the invention is effectively protected from damage due to ion milling.

Figure 1:
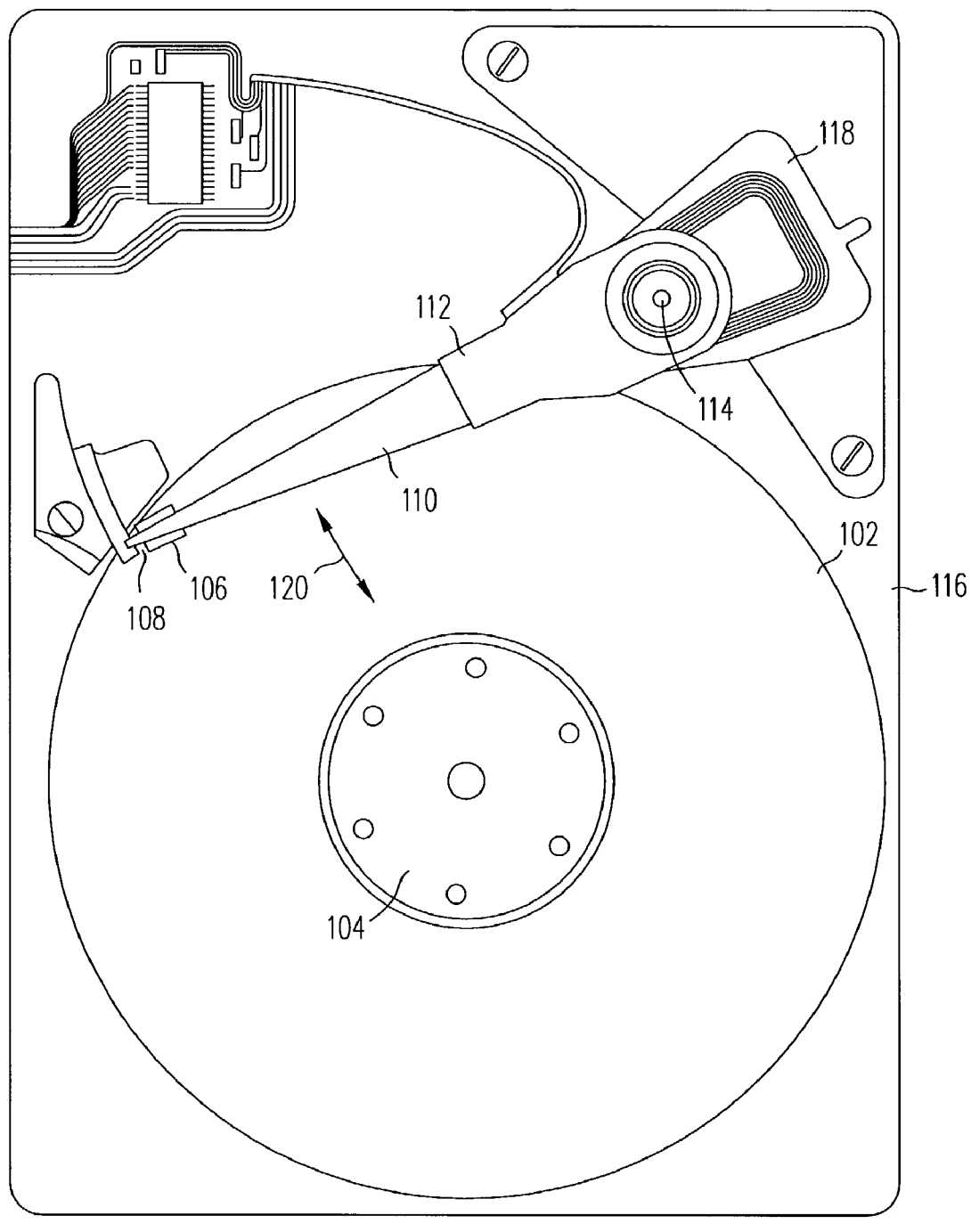
FIG. 1 illustrates a view of a disk drive having a magnetoresistive sensor according to the present invention.

Referring to FIG. 1, a magnetic disk drive 100 has at least one rotatable magnetic disk 102 supported by a spindle 104 and rotated by a motor (not shown). There is at least one slider 106 with an attached recording head 108 positioned over the disk 102 surface while reading and writing. The recording head 108 includes a write element for writing data onto the disk 102. The recording head also includes a magnetic spin valve sensor according to the present invention (shown in detail below) used as a read element for reading data from the disk. The slider 106 is attached to a suspension 110 and the suspension 110 is attached to an actuator 112. The actuator 112 is pivotally attached 114 to the housing 116 of the disk drive 100 and is pivoted by a voice coil motor 118. As the disk is rotating, the actuator 112 positions the slider 106 and suspension 110 along a radial arcuate path 120 over the disk 102 surface to access the data track of interest.

Again referring to FIG. 1, during operation of the disk drive 100, the motion of the rotating disk 102 relative to the slider 106 generates an air bearing between the slider 106 and the disk 102 surface which exerts an upward force on the slider 106. This upward force is balanced by a spring force from the suspension 110 urging the slider 106 toward the surface of the disk 102. Alternatively, the slider 106 may be in either partial or continuous contact with the disk 102 surface during operation.

Figure 2:
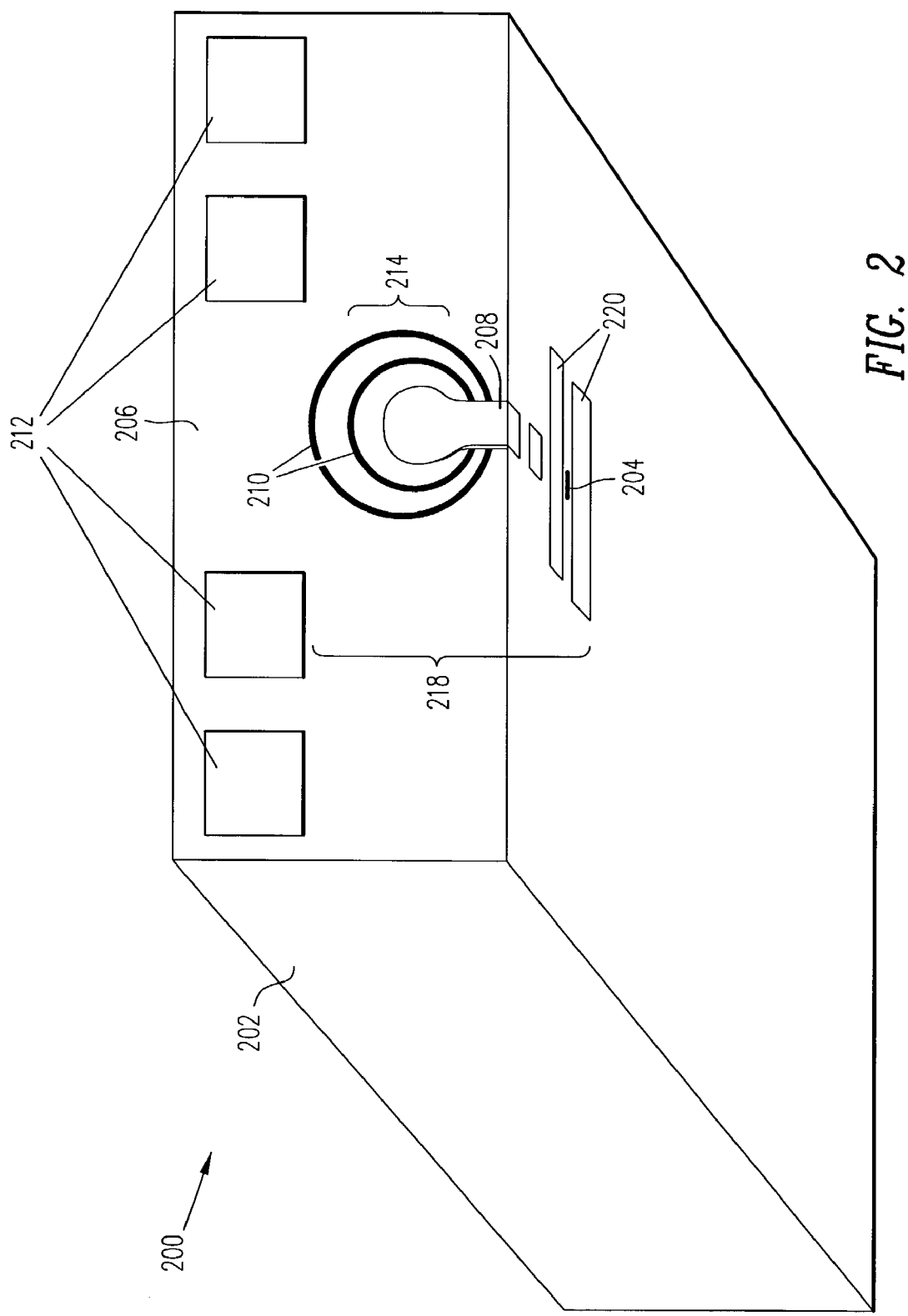
FIG. 2 illustrates a view (not necessarily to scale) of a slider and recording head having a magnetoresistive sensor according to the present invention.

FIG. 2 illustrates a more detailed view of a slider 200. The recording head 218 is preferably constructed on the trailing surface 206 of the slider 200. FIG. 2 illustrates the upper pole 208 and the turns 210 of the coil 214 of the write element of the recording head 218. The read element includes a read sensor 204 disposed between two magnetic shields 220 is formed between the slider body 202 and the write element. The electrical connection pads 212 which allow connection with the write element and read element are illustrated.

Figure 3A:
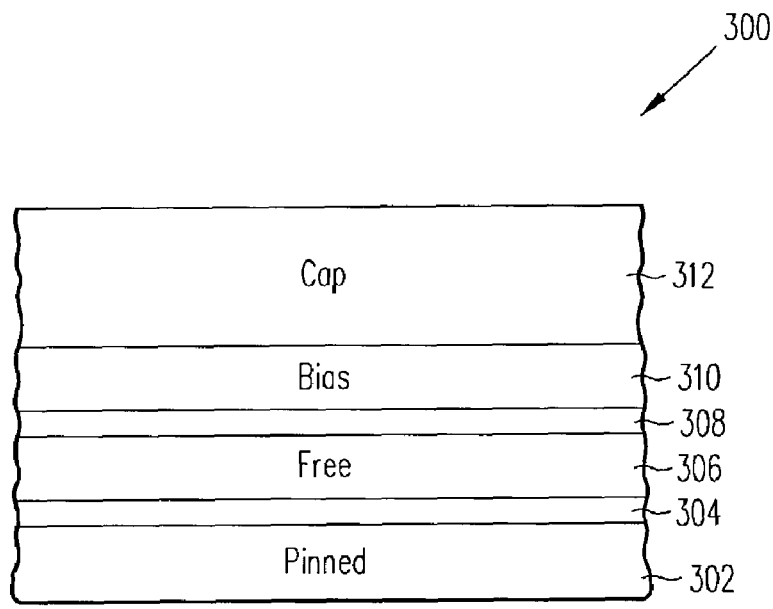
FIG. 3a illustrates a disk facing view (not necessarily to scale) of a magnetoresistive sensor before annealing according to the prior art.

FIG. 3a illustrates a partially completed magnetoresistive sensor 300 according to the prior art. The pinned layer 302 may be a simple layer of ferromagnetic material. Alternatively, the pinned layer 302 may be an assembly of antiparallel coupled ferromagnetic layers. The pinned layer 302 may be formed over an antiferromagnetic layer (not shown). Alternatively, a antiferromagnetic layer may not be necessary if the pinned layer 302 is self-pinned. A nonmagnetic conducting layer 304 is formed over the pinned layer 302. A ferromagnetic free layer 306 is formed over the nonmagnetic conducting layer 304. A thin nonmagnetic layer 308, usually ruthenium, is formed over the free layer 306 and promotes antiparallel coupling with the ferromagnetic bias layer 310 which is formed over the thin nonmagnetic layer 308. A cap layer 312, usually of tantalum, is formed over the bias layer 310. The structure 300 as illustrated in FIG. 3a is now removed from vacuum and annealed at elevated temperature.

Figure 3B:
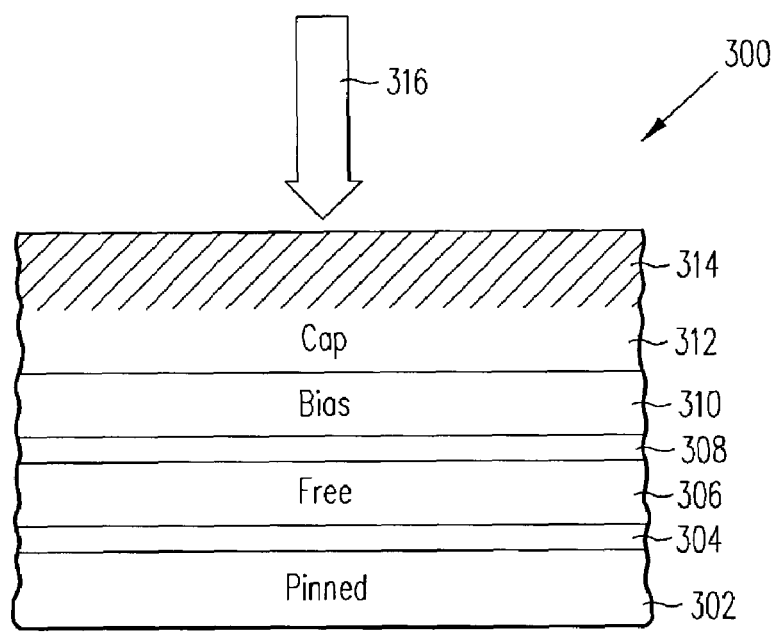
FIG. 3b illustrates the magnetoresistive sensor after annealing according to the prior art.

FIG. 3b illustrates a formation of oxidized material 314 in the cap layer 312 which resulted from the annealing operation. The oxide layer 314 must be removed with ion milling 316 to insure good electrical connection with subsequently formed lead structures (not shown). This ion milling operation 316 must be relatively aggressive to adequately remove the oxide layer 314 thus risking damage to the bias layer 310 and necessitating a thicker cap layer 312.

Figure 4A:
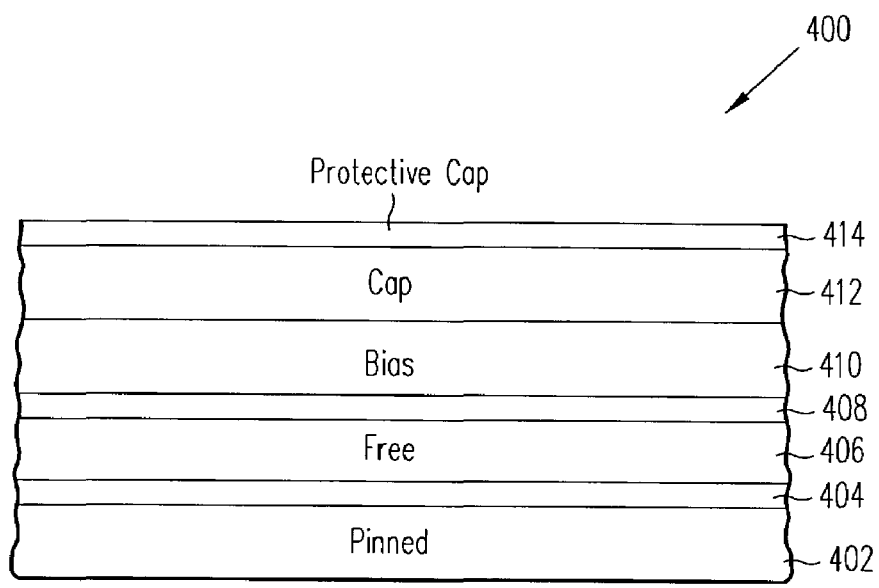
FIG. 4a illustrates a disk facing view (not necessarily to scale) of a magnetoresistive sensor having a protective cap layer before annealing.

FIG. 4a illustrates a view of a partially completed magnetoresistive sensor 400 according to the present invention. The sensor 400 includes a pinned layer 402 which may be a simple layer of ferromagnetic material. Alternatively, the pinned layer 402 may be an assembly of antiparallel coupled ferromagnetic layers. The pinned layer 402 may be formed over an antiferromagnetic layer (not shown). Alternatively, an antiferromagnetic layer may not be necessary if the pinned layer 402 is self-pinned. A nonmagnetic conducting layer 404, typically of copper, is formed over the pinned layer 402. A ferromagnetic free layer 406 is formed over the nonmagnetic conducting layer 404. The free layer 406 may be a single layer of ferromagnetic alloy or alternatively multiple layers of ferromagnetic alloys. Appropriate ferromagnetic alloys are typically formed from binary or tertiary combinations of iron, nickel, and cobalt. A thin nonmagnetic coupling layer 408, usually ruthenium, is formed over the free layer 406. This thin nonmagnetic coupling layer 408 promotes antiparallel coupling between a ferromagnetic bias layer 410 formed over the thin nonmagnetic layer 408 and the underlying free layer 404. The magnetic moment of the bias layer 410 should ordinarily be somewhat greater than the magnetic moment of the free layer 406. A cap layer 412, usually of tantalum, is formed over the bias layer 410. Importantly, a protective cap layer 414 is formed over the cap layer 412. The protective cap layer 414 may be formed from rhodium (Rh), gold (Au), ruthenium (Ru), or other material which protects the cap layer against oxidation and is not readily oxidized itself. The protective cap layer 414 is effective in a thickness range of about 10 to 30 Angstroms. A protective cap layer thicker than 30 Angstroms is also likely to be effective but could add undesirable thickness to the sensor stack. The magnetoresistive sensor 400 as illustrated in FIG. 4a is now removed from vacuum and annealed at elevated temperature.

Figure 4B:
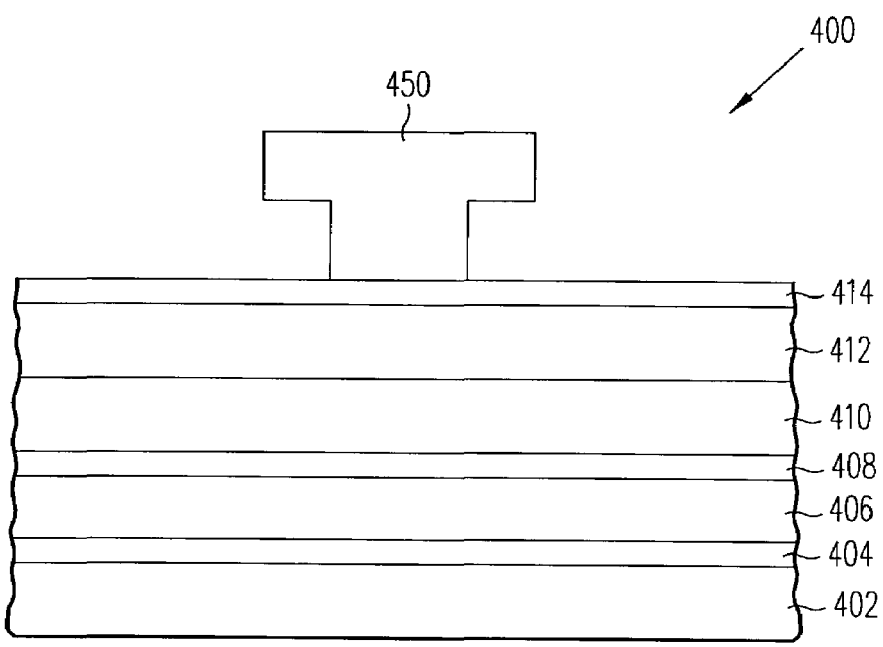
FIG. 4b illustrates a view of the magnetoresistive sensor having a protective cap layer after annealing and formation of the photoresist liftoff structure.

FIG. 4b illustrates a view of the magnetoresistive sensor after annealing and after the formation of a photoresist liftoff structure 450. The cap layer 412 was protected from oxidation during annealing by the protective cap layer 414. The material chosen for the protective cap layer 414 is not readily oxidized during annealing. An advantage of the present invention is that the cap layer can be relatively thin with a thickness range of about 30 to 50 Angstroms. In contrast, the thickness of the cap layer of the prior art (312 in FIGS. 3a and 3b) was typically greater than about 80 Angstroms.

Figure 4C:
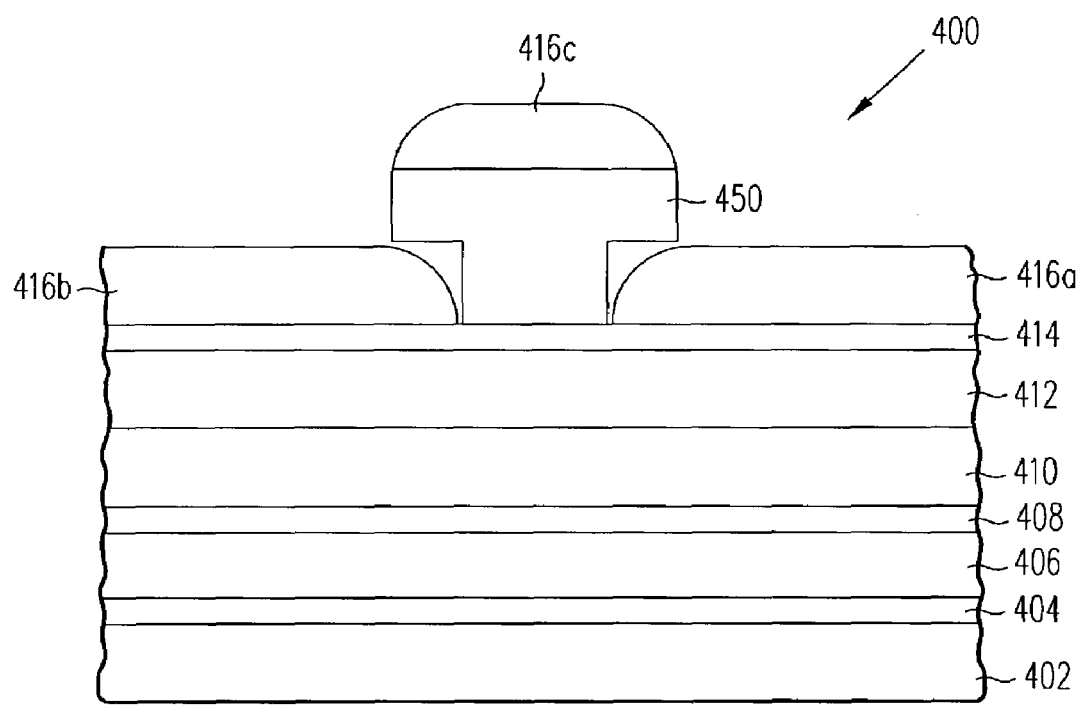
FIG. 4c illustrates a view of the magnetoresistive sensor after deposition of lead material.

FIG. 4c illustrates a view of the deposited lead layers 416a, 416b. The leads 416a, 416b are formed on the protective cap layer 414. Lead material 416c is also formed on the photoresist 450 and will be removed along with the photoresist 450 during liftoff (not shown). Because of the absence of oxidation, there is very low resistance between the lead layers 416a 416b and the underlying protective cap layer 414.

Figure 4D:
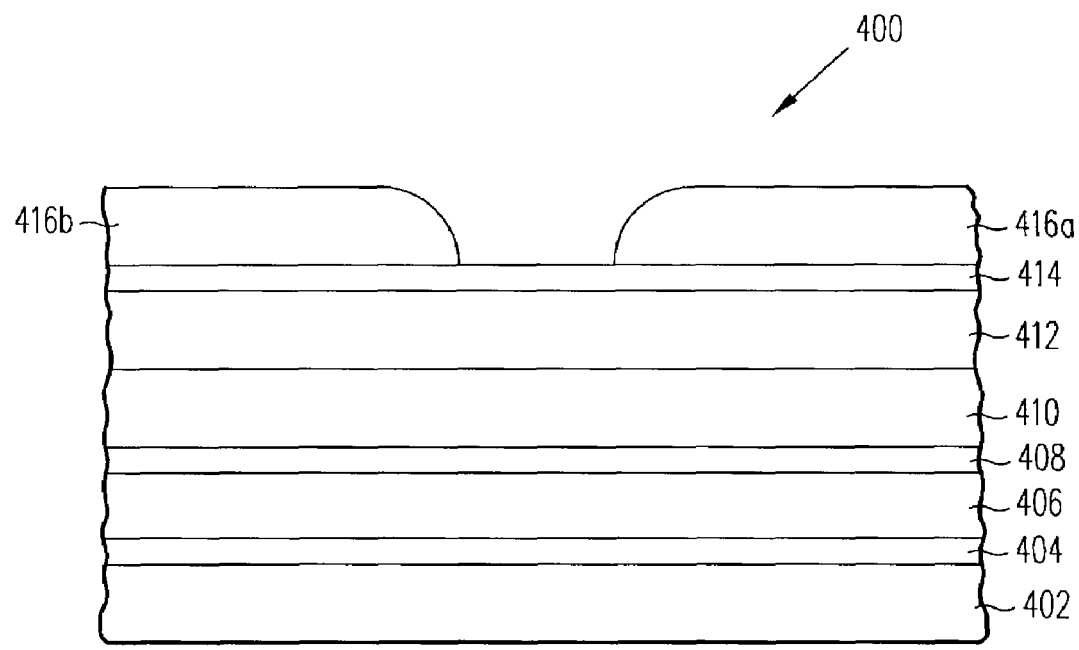
FIG. 4d illustrates a view of the magnetoresistive sensor after liftoff of the photoresist.

FIG. 4d illustrates a view the sensor after liftoff of the photoresist (450 in FIG. 4c).

Figure 4E:
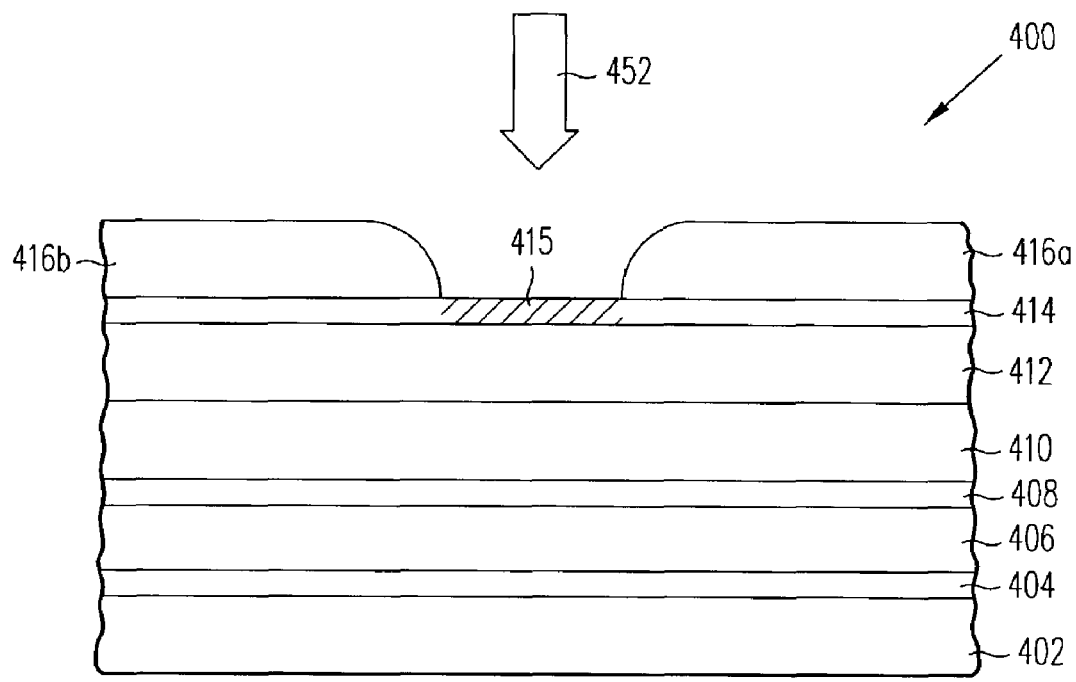
FIG. 4e illustrates a view of the magnetoresistive sensor undergoing ion milling.

FIG. 4e illustrates the use of an ion milling operation 452 to remove an exposed portion, indicated by reference number 415, of the protective cap layer 414. The ion milling operation 452 renders the original protective cap layer 414 into two remaining portions. In subsequent Figures the two remaining portions of the original protective cap layer 414 shall be referred to as two separate layers and are labeled with reference numbers 414a and 414b. Typically, the ion milling operation 452 is only used to remove material 415 which is not covered by the leads 416a, 416b. Thus the possibility of damaging the bias layer 410 other than the exposed area 415 is greatly minimized.

Figure 4F:
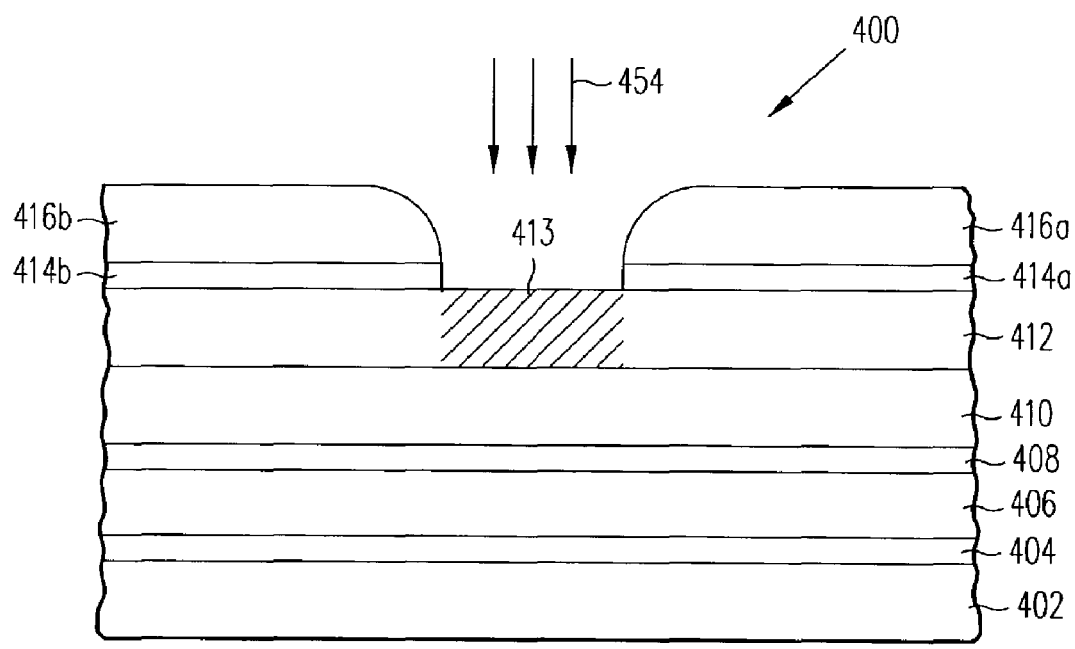
FIG. 4f illustrates a view of the magnetoresistive sensor undergoing fluorine reactive ion etching.

FIG. 4f illustrates the use of a fluorine reactive ion etch 454 to remove an exposed portion 413 of the cap layer 412. The fluorine reactive ion etch 454 renders the original cap layer 412 into two remaining portions. In subsequent Figures the two remaining portions of the cap layer are labeled with reference numbers 412a and 412b. The bias layer 410 serves as an effective etch stop for fluorine reactive ion etching 454.

Figure 4G:
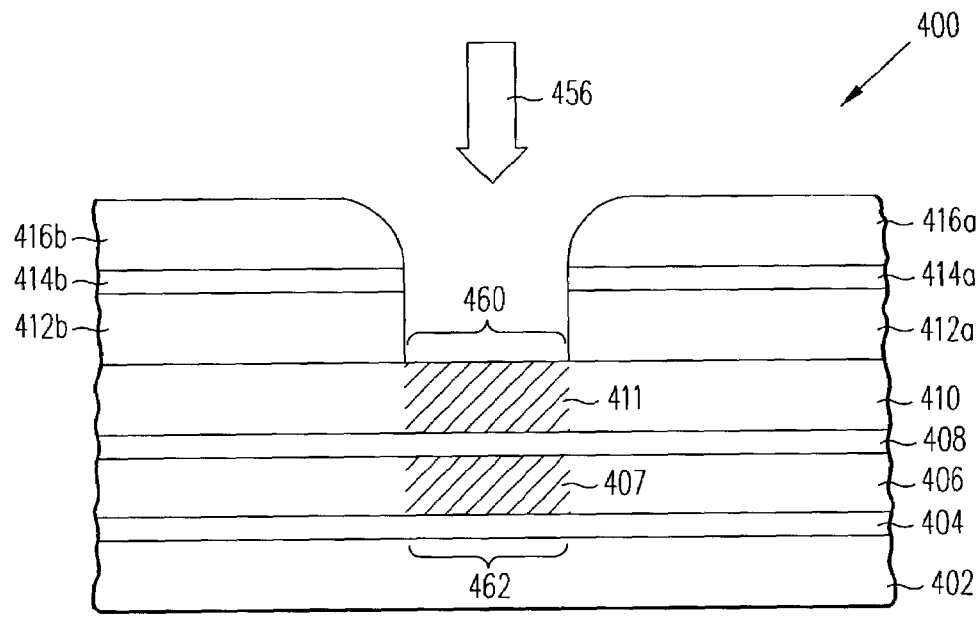
FIG. 4g illustrates a view of the magnetoresistive sensor undergoing oxygen reactive ion etching; and, FIG. 4h illustrates a view of the completed magnetoresistive sensor.

FIG. 4g illustrates the use of an oxygen reactive ion etch 456 to quench the magnetic moment of an exposed portion 411 of the bias layer 410. Some of the material in the exposed portion 411 may be removed and some may remain after the oxygen reactive ion etch 456. The magnetic moment of the exposed portion of the bias layer 410 is destroyed regardless of whether material is removed. The thin nonmagnetic coupling layer 408 serves as an etch stop during oxygen reactive ion etching 456 thus protecting the free layer 406 from damage. Once the magnetic moment of the exposed portion 411 of the bias layer 410 is quenched, the portion 407 of the free layer 406 directly opposite the quenched portion 411 becomes responsive to an external magnetic field. The width 460 of the quenched portion 411 of the bias layer 410 determines the width 462 of the active portion 407 of the free layer 406.

Figure 4H:
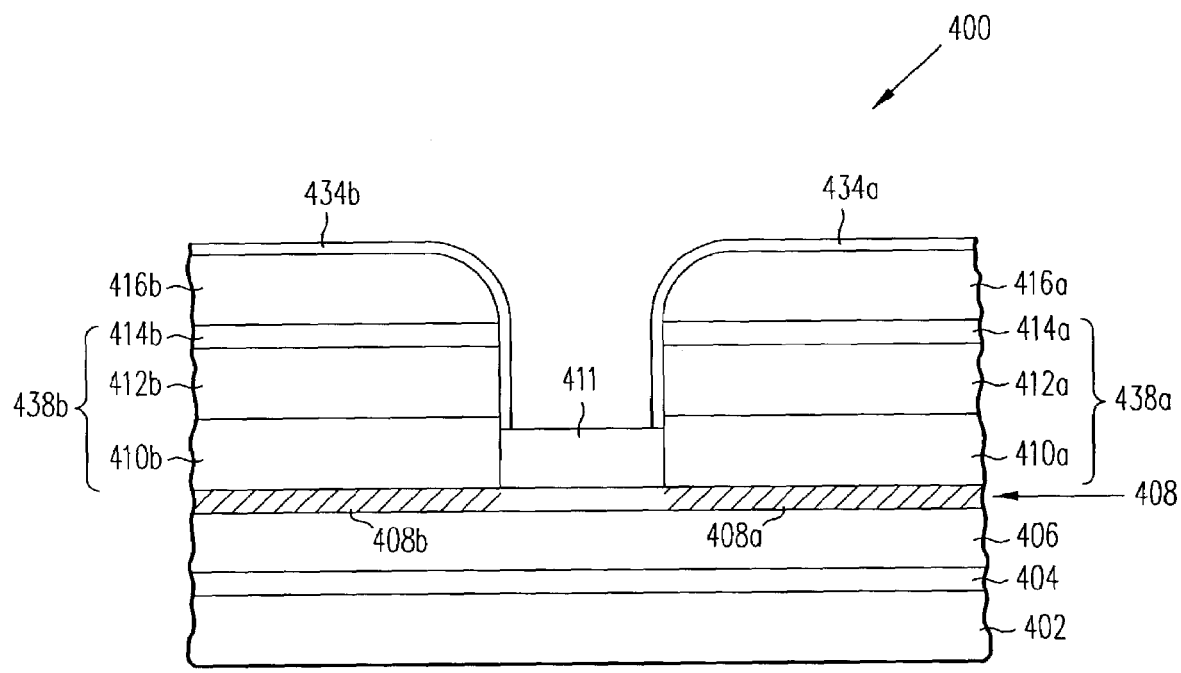

FIG. 4h illustrates a view of the completed sensor 400. The pinned layer 402, the nonmetallic conducting layer 404, the free layer 406, and the nonmagnetic coupling layer 408 have remained during the construction of the sensor 400. Some of the exposed portion 411 of the biasing layer (410 in FIG. 4a) may remain after exposure to the oxygen reactive ion etch (456 in FIG. 4g). Overcoat layers 434a, 434b, typically formed from tantalum have been formed over the leads 416a, 416b. The magnetoresistive sensor 400 as illustrated in FIG. 4h includes two bias stabilization tabs 438a, 438b. Although the bias layer, the cap layer and the protective cap layer were originally deposited as continuous layers, the construction of the sensor has rendered each of these layers into two portions. Therefore, it is convenient to describe the remaining portions of these layers separately. Accordingly, the first bias stabilization tab 438a includes a first bias layer 410a formed over a portion 408a of the nonmagnetic coupling layer 408, a first cap layer 412a, and a first protective cap layer 414a. The second bias stabilization tab 438b includes a second bias layer 410b formed over a portion 408b of the nonmagnetic coupling layer 408, a second cap layer 412b, and a second protective cap layer 414b.

A read element according to the present invention includes a protective cap layer. This protective cap layer effectively protects the cap layer from oxidation. Since the cap layer is protected from oxidation, ion milling is not necessary to remove oxide and the bias layer in the bias stabilization tabs are protected from ion milling damage. The parasitic resistance is significantly reduced. Although specific embodiments of the invention have been described and illustrated, the invention is not to be limited to the specific forms or arrangements thus described. Those skilled in the art will readily recognize other embodiments which fall within the scope of the invention.

We claim:

1. A spin valve magnetoresistive sensor, comprising:
   a ferromagnetic pinned layer;
   a conducting nonmagnetic layer disposed over said pinned layer;
   a ferromagnetic free layer disposed over said conducting nonmagnetic layer;
   a nonmagnetic coupling layer disposed over said free layer, said nonmagnetic coupling layer having a first portion and a second portion;
   a ferromagnetic bias layer disposed over said nonmagnetic coupling layer, said ferromagnetic bias layer having a central portion having a quenched magnetic moment and first and second end portions;
   a first antiparallel coupled bias stabilization tab comprising: said first end portion of said ferromagnetic bias layer formed over said first portion of said nonmagnetic coupling layer, a first cap layer formed over said first end portion of said ferromagnetic bias layer, a first protective cap layer formed over said first cap layer, a first lead layer formed over the first protective cap layer, and a first overcoat formed over the first lead layer;
   a second antiparallel coupled bias stabilization tab comprising: said second end portion of said ferromagnetic bias layer formed over said second portion of said nonmagnetic coupling layer, a second cap layer formed over said second end portion of said ferromagnetic bias layer, a second protective cap layer formed over said second cap layer, a second lead layer formed over the second protective cap layer, and a second overcoat formed over the second lead layer;
   the first and second cap layers, said first and second protective cap layers, and the first and second overcoats are discontinuous, respectively, and spaced apart from each other, respectively, over the central portion of the ferromagnetic bias layer; and
   the first and second overcoats contact portions of the first and second cap layers and the first and second protective cap layers, respectively.

2. A spin valve magnetoresistive sensor as in claim 1 wherein said nonmagnetic coupling layer is formed from ruthenium and said first and said second protective cap layers are formed from rhodium, such that the rhodium is located directly between the lead layers and the car layers.

3. A spin valve magnetoresistive sensor as in claim 1 wherein said first cap layer and said second cap layer are formed from tantalum.

4. A disk drive, comprising:
   a disk;
   a write element for writing data onto said disk;
   a read element for reading data from said disk, said read element including a spin valve magnetoresistive sensor, wherein said spin valve magnetoresistive sensor comprises;
   a ferromagnetic pinned layer;
   a conducting nonmagnetic layer disposed over said pinned layer;
   a ferromagnetic flee layer disposed over said conducting nonmagnetic layer;
   a nonmagnetic coupling layer disposed over said free layer, said nonmagnetic coupling layer having a first portion and a second portion;
   a ferromagnetic bias layer disposed over said nonmagnetic coupling layer, said ferromagnetic bias layer having a central portion having a quenched magnetic moment and first and second end portions;
   a first antiparallel coupled bias stabilization tab comprising: said first end portion of said ferromagnetic bias layer formed over said first portion of said nonmagnetic coupling layer, a first cap layer formed over said first end portion of said ferromagnetic bias layer, a first protective cap layer formed over said first cap layer, a first lead layer formed over the first protective cap layer, and a first overcoat formed over the first lead layer;

a second antiparallel coupled bias stabilization tab comprising: said second end portion of said ferromagnetic bias layer formed over said second portion of said nonmagnetic coupling layer, a second cap layer formed over said second end portion of said ferromagnetic bias layer, a second protective cap layer formed over said second cap layer, a second lead layer formed over the second protective cap layer, and a second overcoat formed over the second lead layer;

the first and second cap layers, said first and second protective cap layers, and the first and second overcoats are discontinuous, respectively, and spaced apart from each other, respectively, over the central portion of the ferromagnetic bias layer, and said first and second protective cap layers are formed from rhodium;

the first and second cap layers are tantalum, such that the rhodium is located directly between the lead layers and the tantalum; and the first and second overcoats contact portions of the rhodium and the tantalum.

5. A disk drive as in claim 4 wherein said nonmagnetic coupling layer is formed from ruthenium.

* * * * *